United States Patent [19]
Tominaga et al.

[11] 4,190,564
[45] Feb. 26, 1980

[54] CATIONIC ELECTROPHORETIC COATING COMPOSITIONS

[75] Inventors: Akira Tominaga; Yasuyuki Hirata, both of Hiratsuka, Japan

[73] Assignee: Kansai Paint Company, Limited, Amagasaki, Japan

[21] Appl. No.: 942,280

[22] Filed: Sep. 14, 1978

Related U.S. Application Data

[63] Continuation of Ser. No. 783,229, Mar. 31, 1977, abandoned.

[30] Foreign Application Priority Data

Jun. 29, 1977 [JP] Japan ................................. 52-38649

[51] Int. Cl.$^2$ ............................................. C08L 91/00
[52] U.S. Cl. .......................... 260/18 PT; 260/18 PN; 260/18 EP; 260/29.2 EP; 260/33.2 EP; 525/107; 525/123; 525/463
[58] Field of Search ......... 260/18 PT, 18 PN, 18 EP, 260/29.2 EP, 33.2 EP, 830 P

[56] References Cited
U.S. PATENT DOCUMENTS

| | | | |
|---|---|---|---|
| 3,336,253 | 8/1967 | Wong et al. | 260/29.2 EP |
| 3,449,281 | 6/1969 | Sullivan et al. | 260/29.2 EP |
| 3,804,786 | 4/1974 | Sekmakas | 260/18 PT |
| 3,945,964 | 3/1976 | Hastings et al. | 260/29.2 EP |
| 3,947,338 | 3/1976 | Jerakek et al. | 260/29.2 EP |
| 4,009,133 | 2/1977 | Jones | 260/29.2 EP |
| 4,031,050 | 6/1977 | Jerabek | 260/29.2 EP |
| 4,036,795 | 7/1977 | Tominaga | 260/29.2 EP |

Primary Examiner—Melvyn L. Marquis
Attorney, Agent, or Firm—Larson, Taylor and Hinds

[57] ABSTRACT

A cationic electrophoretic coating composition comprising:

(A) a water-soluble or water-dispersible resin prepared by neutralizing with an acid addition products of partially blocked polyisocyanate and the reaction products, said reaction products being prepared by reacting at least one of fatty acid and polyamide with adducts prepared by being allowed an epoxy resin to react with a basic amino compound, and (B) at least one of addition polymers of at least one of ethylene oxide and propylene oxide and derivatives of the addition polymers, the polymers and the derivatives thereof having a number average molecular weight of 500 to 10,000 and having a solubility of up to 60 parts by weight in 100 parts by weight of water at 25° C.

11 Claims, No Drawings

CATIONIC ELECTROPHORETIC COATING COMPOSITIONS

This is a continuation of application Ser. No. 783,229 filed Mar. 31, 1977, now abandoned.

This invention relates to cationic electrophoretic coating compositions, and more particularly to such coating compositions containing a modified addition product of an epoxy resin and a basic amino compound and polyoxyalkylene compound, the product being contained as neutralized with an acid.

It is widely known that epoxy resins such as those of the bisphenol A-epichlorohydrin type, exhibit excellent corrosion resistance and adhering properties of the film obtained. It is also known that such epoxy resins can be rendered soluble in water by being allowed to react with a primary or secondary amine and thereafter neutralized with an acid. When admixed with a curing agent such as a partially blocked polyisocyanate, the solubilized amine-adducted epoxy resin may be usefull as a vehicle for electrophoretic coating compositions. However, it is difficult to obtain the coating films having a uniform and effective thickness (usually 20 to 25$\mu$) from the coating composition. This drawback can be overcome temporarily by the use of a large quantity of organic solvent soluble in water, resulting in coating films of uniform and effective thickness, but it is difficult to deposit a coating film on the workpiece and obtain an effective film thickness in the course of the continuous coating. (The performance of the coating composition, evaluated with the lapse of time as above, will hereinafter be referred to as "stability." Thus, when the performance of a coating composition reduces with the lapse of time, the composition will be described, for example, as having "a low stability.") To obtain practically effective film thicknesses, the voltage may be raised, but a film then formed will be ruptured. Presumably, this is attributable to a reduction in the flowability of the resin resulting from the evaporation of the solvent contained in the composition, or to changes in the state of the dispersed resin.

An object of this invention is to provide cationic electrophoretic coating compositions containing an acidneutralized and modified addition product of an epoxy resin and a basic amino compound for giving uniform and effective film thickness generally ranging from 20 to 25$\mu$.

Another object of this invention is to provide such coating compositions having an excellent stability.

These and other objects of this invention will become apparent from the following description.

The cationic electrophoretic coating composition of this invention comprises:

A. a water-soluble or water-dispersible resin prepared by neutralizing with an acid addition products of partially blocked polyisocyanate with the reaction products, the reaction product being prepared by reacting at least one of fatty acid and polyamide with adducts prepared by being allowed an epoxy resin to react with a basic amine compound, and B. at least one of addition polymers of at least one of ethylene oxide and propylene oxide and derivatives of the addition polymers, the polymers and the derivatives having a number average molecular weight of 500 to 10,000 and having a solubility of up to 60 parts by weight in 100 parts by weight of water at 25° C.

Useful epoxy resins for the preparation of the component A of this invention are polyepoxides of polyphenol having at least two epoxy groups per molecule, such as resins made from bisphenol A and epichlorohydrin, resins made from hydrogenated bisphenol A and epichlorohydrin or from bisphenol A and $\beta$-methylepichlorohydrin, polyglycidyl ethers of novolaks, etc., among which especially preferable are those prepared from bisphenol A and epichlorohydrin. Conjointly usable with these epoxy resins of the polyphenolepichlorohydrin type are:

(a) polyglycidyl ethers of epichlorohydrin and a polyhydric alcohol such as ethylene glycol, propylene glycol, glycerin or trimethylolpropane, (b) polyglycidyl esters of epichlorohydrin and a polycarboxylic acid such as adipic acid, phthalic acid or dimer acid, (c) polyepoxides obtained by epoxidizing an alicyclic olefin or 1,2-polybutadiene. These resins can be used in an amount which will not impair the corrosion resistance of the polyphenol-epichlorohydrin type epoxy resins, i.e. in an amount of up to 50% by weight based on the combined amount of all the epoxy resins used.

Examples of useful alicyclic olefins are cyclohexene, vinylcyclohexene, dicyclopentadiene, dipentene, etc.

A water-soluble aliphatic amino compound having a primary or secondary amino group is used as the basic amino compound to be reacted with these epoxy resins. Useful examples thereof are: (a) propylamine, butylamine, diethylamine, dipropylamine and like mono- and di-alkylamines, (b) ethanolamine, propanolamine, diethanolamine, dipropanolamine and like mono- and di-alkanolamines, (c) cyclohexylamine, pyrrolidine, morpholine and like alicyclic monoamines, and (d) ethylenediamine, hexamethylenediamine, diethylenetriamine, triethylenetetramine, tetraethylenepentamine, propylenediamine, dipropylenetriamine, butylenediamine, N-aminoethanolamine, diethylethylenediamine, diethylaminopropylamine, piperazine, N-methylpiperazine, N-aminoethylpiperazine and like polyamines.

Conjointly usable with these aliphatic amino compounds are aniline, N-methylaniline, toluidine, benzylamine, m-xylylenediamine, phenylenediamine, 4,4'-diaminodiphenylmethane and like aromatic amino compounds. It is preferable to use these aromatic amino compounds in such an amount that the epoxy resin-amine adduct obtained and neutralized with an acid will retain the desired dispersibility in water, i.e. usually in an amount of equal to or less than moles of aliphatic amine compounds.

The epoxy resin and basic amino compound undergo reaction when merely mixed together at room temperature. To complete the reaction which is exothermic, it is desirable to adjust the reaction system to a temperature of 50° to 150° C., preferably 70° to 130° C., in the final stage of the reaction.

The amount of basic amino compound to be reacted with the epoxy resin is such that the resulting product, when neutralized with an acid, will be fully soluble in water. Usually it is used in an amount of not exceeding one mole per mole of epoxy group. (The reaction product will hereinafter be referred to as "epoxy resin-amine adduct".)

Examples of useful addition products of partially blocked polyisocyanate with the reaction product of at least one of fatty acid and polyamide and the epoxy resin-amine adduct are:

the addition product of a partially blocked polyisocyanate (1–100 parts, preferably 5–50 parts by weight per 100 parts by weight of epoxy resin) having not more than one free isocyanate group and at least one blocked isocyanate group in the molecule on the average to the reaction product of fatty acid and/or polyamide (1–100 parts, preferably 5–70 parts by weight per 100 parts by weight of epoxy resin) and the epoxy-resin-amine adduct prepared by being allowed an epoxy resin to react with a basic amino compound.

Examples of useful fatty acids for the preparation of the reaction products are non-drying, semi-drying and drying oil fatty acids such as safflower oil fatty acid, linseed oil fatty acid, soybean oil fatty acid, tall oil fatty acid, cotton seed oil fatty acid, coconut oil fatty acid, tung oil fatty acid, oicitica oil fatty acid, dehydrated castor oil fatty acid, etc. These fatty acids are used singly or in admixture. The reaction products is prepared by reacting 100 parts by weight of the epoxy resin with 1–100 parts, preferably 5–70 parts by weight of the fatty acid at about 80° to 130° C. and reacting the basic amino compound with the product, or by reacting the fatty acid with the epoxy resin-amine adduct generally at about 150° to about 230° C.

Examples of preferable polyamides for the preparation of the reaction products are amino-containing high-molecular-weight compounds obtained by condensing a dicarboxylic acid, such as phthalic acid, adipic acid, sebacic or dimeric fatty acid, with a polyamine, such as ethylenediamine, hexamethylenediamine, diethylenetriamine, triethylenetetramine, propylenediamine or butylenediamine. Also useful are polyamides obtained by subjecting a lactam, such as $\epsilon$-caprolactam, to ring-opening polymerization and condensing the resulting oligomer with a polyamine, or polyester polyamides similarly obtained by using an alkanolamine, such as ethanolamine or propanolamine, in place of the polyamine. These polyamides contain in the molecule amino and amido groups which can react with epoxy groups. Usually, it is used in an amount of 1–100 parts, preferably 5–70 parts by weight per 100 parts by weight of the epoxy resin. Preferably, the epoxy resin-amine adduct is reacted with the polyamide at 50° to 200° C., more preferably at 80° to 150° C., whereby the polyamide is adducted to the epoxy groups.

The partially blocked polyisocyanate compounds to be used for the preparation of the addition products are those having in the molecule not more than one free isocyanate group and at least one blocked isocyanate group on the average. Examples of useful polyisocyanates are aromatic or aliphatic diisocyanates, such as m- or p-phenylene diisocyanate, 4,4'-diphenylmethane diisocyanate, 2,4- or 2,6-tolylene diisocyanate, m- or p-xylylene diisocyanate, hexamethylene diisocyanate, dimer acid diisocyanate and isophorone diisocyanate; adducts of an excess of such diisocyanate with a polyol such as ethylene glycol, propylene glycol, glycerin, trimethylolpropane or pentaerythritol; polyisocyanates such as a trimer of the diisocyanate.

Useful agents for blocking the polyisocyanates are volatile active low-molecular-weight hydrogen compounds including, for example, aliphatic or aromatic monoalcohols such as methanol, ethanol, propanol, butanol, hexanol, cyclohexanol, benzyl alcohol, ethylene glycol monoethyl ether and ethylene glycol monobutyl ether; hydroxy-tert.amines such as dimethyl- and diethyl-aminoethanol; oximes such as acetoxime and methyl ethyl ketone oxime; phenol; cresol; etc. Among these examples, aliphatic or aromatic monoalcohols are preferable. The partially blocked polyisocyanate compounds are obtained by reacting the polyisocyanate with an amount of the blocking agent sufficient to cause the isocyanate to have not more than one free isocyanate group in the molecule. The reaction is highly exothermic, so that it is preferable to conduct the reaction by adding the blocking agent dropwise to the polyisocyanate. It is desirable to effect the reaction at the lowest possible temperature of 20° to 80° C. while providing a great difference in reactivity between the isocyanate groups in the molecule. The reaction of the reaction product with the partially blocked isocyanate compound can be easily carried out by heating the mixture at 40° to 130° C., preferably at 60° to 110° C., for 1 to 3 hours, whereby the free isocyanate group is added to the hydroxyl or amino group.

The addition products are prepared by the addition reaction of the reaction product of fatty acid and/or polyamide and epoxy resin-amine adduct with the partially blocked isocyanate compound. For this reaction, the epoxy resin is reacted with the basic amino compound and with the fatty acid and/or polyamide first, and the partially blocked polyisocyanate is reacted with the resulting product at 40° to 130° C., preferably at 60° to 110° C. Alternatively, the partially blocked polyisocyanate is reacted with the reaction product of the epoxy resin with the amino compound first, and the fatty acid and/or polyamide is reacted with the resulting product.

Preferably, the component A has an amine value of 25 to 400, especially 50 to 200. With the amine value in this range, the component, when neutralized with an acid, will be highly dispersible in water, giving coating films of enhanced corrosion resistance and also permitting an efficient electrophoretic operation. It is desired that the component A be free of any unreacted basic amine compound.

In this invention, all amine values are determined by the following method.

The sample (0.2 to 0.3 g) is placed in 100-ml Erlenmeyer flask, dissolved with heating and then cooled. The sample is titrated with N/10 aqueous solution of HCl with the use of Bromophenol Blue as an indicator. A color change from blue to yellow is the end point. The amine value is given by:

$$\text{Amine value} = \frac{\text{Amount of N/10 HCl (ml)} \times \text{Potential of N/10 HCl}}{\text{Amount of sample (g)} \times \text{Solids (\%)/100}} \times 5.61$$

Preferable examples of acid used for neutralization are water soluble monocarboxylic acids such as formic acid, acetic acid, propionic acid, glycolic acid, lactic acid, etc. These acids are used singly or in admixture. These acids may also be used in combination with polycarboxylic acid such as oxalic acid, succinic acid, phthalic acid, etc., higher carboxylic acid such as caproic acid, palmitic acid, etc. inorganic acid such as hydrochloric acid, nitric acid, sulfuric acid, phosphoric acid, etc. in an amount of more than 75% by mole equivalent.

The component B of the present compositions is an addition polymer of at least one of ethylene oxide and propylene oxide and/or derivatives of the polymer. Examples of the derivatives are esters of the polymer with fatty acid or urethanes of the polymer with isocyanate compounds. The addition polymer and the derivatives have a number average molecular weight of 500 to 10,000 and further have a solubility of up to 60 parts by weight in 100 parts by weight of water at 25° C. If the number average molecular weight is lower than 500, stability becomes poor. If it is higher than 10,000, the film obtained is inferior in smoothness. Preferably, the number average molecular weight is 700–5000. Further when the solubility in water exceeds 60% by weight, stability becomes poor. The preferred solubility is less than 20 parts by weight. The addition polymer is prepared by being allowed ethylene oxide or propylene oxide to react with alcohol or phenol in the presence of alkali under normal temperature and normal pressure.

Examples of useful derivative of the addition polymers are: (a) monoalcohol-type derivatives obtained by subjecting monoalcohol and at least one of propylene oxide and ethylene oxide to addition polymerization; (b) diol-type derivatives obtained by subjecting to addition polymerization a diol, such as ethylene glycol or propylene glycol, and at least one of propylene oxide and ethylene oxide; (c) polyol-type derivatives obtained by subjecting to addition polymerization an alcohol having at least three hydroxyl groups in the molecule, such as glycerin, trimethylolpropane, pentaerythritol or sorbitol and at least one of propylene oxide and ethylene oxide; (d) phenol-type derivatives obtained by subjecting to addition polymerization an alkyl phenol with an alkyl having at least 8 carbon atoms and at least one of propylene oxide and ethylene oxide; (e) urethanated derivatives having no free isocyanate group and obtained by reacting an addition polymer of ethylene oxide and/or propylene oxide with an isocyanate compound, such as phenyl isocyanate, tolylene diisocyanate, xylylene diisocyanate, 4,4'-diphenylmethane diisocyanate, hexamethylene diisocyanate or isophorone diisocyanate; and (f) esters having no free carboxyl group and obtained by reacting an addition polymer of ethylene oxide and/or propylene oxide with at least one of a non-drying, semi-drying or drying oil fatty acid, abietic acid or like resin acid, and phthalic anhydride, isophthalic acid, succinic acid, adipic acid or like carboxylic acid.

According to this invention, the component B, i.e. the polyether, is used in an amount preferably of 0.5 to 30% by weight, more preferably of 3 to 20% by weight, based on the component A as solid, i.e. the neutralized water-soluble or water-dispersible resin. With less than 0.5% by weight, the component B fails to act effectively in improving the appearance of the coating and the stability, whereas if over 30% by weight of the component B is used, the resulting coating will have insufficient hardness and water resistance.

The objects of this invention can be fulfilled by coating compositions comprising the components A and B.

Other useful blocking agents are acetoacetates, malonates, acetylacetone and like compounds having an active methylene group, or derivatives thereof. The partially blocked polyisocyanate compounds can be prepared by reacting the polyisocyanate compound will less than equivalent of the blocking agent with heating at 20° to 120° C., preferably at 40° to 100° C. An ester-type solvent such as ethylene glycol monoethyl ether acetate or ethyl acetate, or a ketone-type solvent such as cyclohexanone or diethyl ketone, which is inert to the isocyanate group, may be used in order to effect the reaction smoothly.

The coating compositions of this invention may further contain a cationic or nonionic water-soluble or water-dispersible resin as another vehicle component in such an amount as will not result in reduced corrosion resistance. The amount is usually up to 20% by weight calculated as solids and based on the whole resin solids. Examples of useful cationic or nonionic water-soluble or water-dispersible resins are methylolated phenolic resin, methylolated melamine resin, polyacryleamide, polyvinyl pyrrolidone, polyvinyl acetate, polyvinyl ether, copolymer of dialkylaminoethyl methacrylate or of dialkylaminopropyl methacrylate, reaction product of a secondary amine and copolymer of glycidyl methacrylate, etc.

The coating compositions of this invention, although usable as clear compositions, are usually used with addition of a pigment.

Examples of useful pigments are those usually used for electrophoretic coating compositions, such as red iron oxide, titanium dioxide, carbon black, clay, mica and like coloring and extender pigments. These pigments are usable in any desired amount. The present compositions may further contain other additives such as usual surfactants which are used for cationic electrophoretic coating compositions.

The coating compositions of this invention are prepared by dispersing a pigment in the neutralized component A, adding the component B to the dispersion along with other resins which may be used as desired, and dissolving or dispersing the mixture in water or, alternatively, by dispersing the pigment in a mixture of unneutralized component A and component B, neutralizing the resulting mixture and diluting the mixture with water. Otherwise, the compositions may be formulated by the usual method of preparing electrophoretic coating compositions.

The electrophoretic coating compositions of this invention are adjusted to a pH of 3 to 8, preferably 5 to 7, with the use of the aforesaid water-soluble organic or inorganic acid. Usually, the acid is used by less than 1.0 equivalent, preferably 0.1–0.6 equivalent to amine value of the resin.

The overall resin concentration of the present compositions is preferably 3 to 30% by weight, more preferably 5 to 15% by weight.

The present compositions may be used for electrophoretic coating operation with use of a usual apparatus under the conditions generally employed for such operation. However, it is preferable to use the workpiece as the cathode and a carbon plate as the anode.

The coating film formed on the cathode is baked and hardened usually at 140° to 250° C., preferably at 170° to 220° C.

The present compositions are suitable for coating usual steel sheets treated with zinc phosphate and also for coating steel sheets treated with iron phosphate and untreated steel sheets which are prone to corrosion. They give sufficient corrosion resistance without containing any hexavalent chromium compound. This is an advantage which has not been afforded by the conventional electrophoretic coating compositions. Furthermore, the present compositions are suited for coating zinc-plated steel sheets, tin-plated steel sheets and substrates made of aluminum, copper and copper alloys.

This invention will be described below in greater detail with reference to Examples, to which the invention is not limited.

The parts and percentages given in the Examples are all by weight.

EXAMPLE 1

500 parts of epoxy resin of the bisphenol A type (trade mark: "EPIKOTE 1001," product of Shell Chemical Co.) having an epoxy equivalent of about 500 was dissolved into 210 parts of ethyleneglycol monoethyl ether monoacetate with heating, and then was allowed to react with 105 parts of diethanolamine at 100° C. for 2 hours and with 25 parts of linseed oil fatty acid at 180° C. for 5 hours to obtain a modified epoxy resin-amine adduct having an amine value of 86. Subsequently, ethylene glycol monoethyl ether (90 parts) is added dropwise to 174 parts of tolylene diisocyanate [2,4-TDI=80%, 2,6-TDI=20% (TDI means tolylene diisocyanate)] at 60° C. over a period of 2 hours, and the mixture is further reacted for 2 hours, giving 264 parts of partially blocked isocyanate. The compound is added to the adduct, and the mixture is reacted at 80° C. for 1.5 hours to obtain a basic resin composition having an amine value of 50 and containing 81% of solids.

To 123 parts of the composition are added 10 parts of polypropylene glycol having a number average molecular weight of 4,000, 3.2 parts of glacial acetaic acid and 114 parts of deionized water to prepare a composition of this invention containing 40% of solids.

EXAMPLE 2

In 250 parts of ethylene glycol monoethyl ether (hereinafter referred to as "cellosolve") was dissolved with heating, 425 parts of epoxy resin of the bisphenol A type (trade mark: "EPIKOTE 1004," product of Shell Chemical Co.) having an epoxy equivalent of about 950. Ethylenediamine (30 parts) was added to the solution at 40° C. at a time, and the mixture was reacted at 50° C. for 4 hours and thereafter at 80° C. for 2 hours. The resulting product was then reacted with tall oil fatty acid (90 parts) at 160° C. for 2 hours and with the same partially blocked polyisocyanate (100 parts) as used in Example 1 at 50° C. for 1 hour to obtain a basic resin composition having an amine value of 100 and containing 72% of solids. To 139 parts of the composition were added with stirring 7.2 parts of lactic acid and 104 parts of deionized water. The mixture was diluted to solids concentration of 40%. To 250 parts of the dilution are added 5 parts of triol-type polyether (trade mark: "New Pol T-L.4500", Sanyo Chemical Industry Co. Ltd. Japan) having a molecular weight of 4,500 and prepared by subjecting trimethylolpropane, propylene oxide and ethylene oxide to addition reaction and 82 parts of deionized water to prepare a composition of this invention containing 40% of solids.

EXAMPLE 3

To 250 parts of epoxy resin of the novolakphenol type (trade mark: "DEN 442," product of Dow Chemical Co., U.S.A.) having an epoxy equivalent of about 250 were added 100 parts of butyl cellosolve and 105 parts of a mixture of conjugated linolic acid (45–50% by weight), linolic acid (38–43% by weight), oleic acid (7–9% by weight) and saturated fatty acid (3–5% by weight), and the ingredients were mixed together with heating at 120° C. and reacted until the acid value reaches zero. Diethanolamine (66 parts) was added to the reaction mixture, and the resulting mixture was reacted for 1.5 hours. Subsequently, 25 parts of the same partially blocked polyisocyanate as used in Example 1 was added and the mixture was reacted at 90° C. for 2 hours to obtain a basic resin composition having an amine value of 75 and containing 80.5% of solids.

To 124 parts of the composition were added 3.5 parts of propionic acid and 120 parts of deionized water to prepare a cationic aqueous dispersion (component A). Subsequently, 7.2 parts of coconut oil fatty acid and 20 parts of a phenol-type polyether (trade mark: "Noigen EA", Dai-ichi Kogyo Seiyaku K. K.) obtained by subjecting octyl phenol and ethylene oxide to addition polymerization were esterified in the usual manner to obtain a polyether compound. Deionized water is added to 5 parts of the compound, giving a composition of this invention containing 40% of solids.

EXAMPLE 4

In 200 parts of cyclohexanone was dissolved, with heating, 100 parts of epoxy resin of the bisphenol A type (trade mark: "EPIKOTE 1004", product of Shell Chemical Co.) having an epoxy equivalent of about 915. Diethylamine (26.4 parts) was added to the solution, and the mixture was reacted at 90° C. for 2 hours. To the reaction mixture was added 90 parts of polyamide of the dimer acid type (trade mark: "Tohmide #240", Fuji Chemical Industry Co. Ltd.) having the amine value of 330 and the viscosity of 2000 CPS. The mixture was heated at 110° C. for one hour and reacted at 60° C. for 1 hour with 100 parts of partially blocked isocyanate obtained by reacting 135 parts of cellosolve with 174 parts of tolylene diisocyanate. To 200 parts of the resulting reaction mixture were added 5.5 parts of acetic acid, 160 parts of deionized water, 7.5 parts of polypropylene glycol having a number average molecular weight of 1,000, whereby a composition of this invention is prepared which contains 40% of solids.

EXAMPLE 5

A mixture was prepared with heating from 200 parts of epoxy resin of the bisphenol A type (trade mark: "EPON 828", product of Shell Chemical Co.) having an epoxy equivalent of about 200, 51 parts of diisopropanolamine and 170 parts of cellosolve acetate and was reacted at 80° C. for 3 hours to obtain an epoxy resin-amine adduct. Subsequently, 74 parts of n-butanol was added dropwise to 164 parts of tolylene diisocyanate at 50° C. over a period of 2 hours, and the mixture was reacted at 60° C. for 2 hours, giving 238 parts of partially blocked isocyanate resin. The adduct was reacted with the resin at 70° C. for 2 hours. To the reaction mixture added 100 parts of alkylene-polyamine-dimer acid type polyamide (trade mark: "Versamid 115" Dai-ichi General Industry Co. Ltd.) having the amine value of 220 and viscosity of 60000 CPS, and the mixture was reacted at 80° C. for 2 hours. To the resulting mixture was added 10 parts of polyurethanated polyol obtained by reacting 20 parts of polypropylene glycol (molecular weight: 1,000) with 2.4 parts of tolylene diisocyanate at 100° C. for 4 hours. To 124 parts of the mixture were added 2.5 parts of hydroxyacetic acid and 60 parts of deionized water, whereby a composition of this invention is prepared which contains 40% of solids.

EXAMPLE 6

In 200 parts of cellosolve acetate was dissolved, with heating, 500 parts of bisphenol-type epoxy resin (trade mark: "Araldite 6071", Ciba-Geigy(Japan) Ltd.) having an epoxy equivalent of 485, and 73 parts of diethylamine was added to the solution at 80° C. The mixture was reacted at 115° C. for 2 hours, giving an epoxy resin-amine adduct having an amine value of 90, and then mixed with 50 parts of polyamide resin (trade mark: "Epoky H164" Mitsui-Toatsu Chemical Industry Co. Ltd.) having the amine value of 300 and the viscosity of 450 poise (at 25° C.). Subsequently, 190 parts of partially blocked isocyanate obtained by reacting 168 parts of hexamethylene diisocyanate with 94 parts of phenol at 120° C. for 3 hours was reacted with the adduct at 90° C. for one hour to prepare a basic resin composition having an amine value of 90 and containing 80.5% of solids. To 124 parts of the composition are added 4.0 parts of hydroxyacetic acid and 120 parts of deionized water, giving a cationic aqueous resin dispersion (component A). To 250 parts of the dispersion are added 59 parts of deionized water and 2.5 parts of polyurethanated polyol prepared by reacting 20 parts of polypropylene glycol (molecular weight: 2,000) with 2.6 parts of partially blocked isocyanate at 120° C. for 4 hours, the partially blocked isocyanate being prepared by blocking tolylene diisocyanate with cellosolve. The resulting mixture is a composition of this invention containing 40% of solids.

EXAMPLE 7

In 120 parts of methyl isobutyl ketone is dissolved, with heating, 200 parts of bisphenol-type epoxy resin (trade mark: "EPON 828", product of Shell Chemical Co.) having an epoxy equivalent of about 200, and 42 parts of diethanol amine was added to the solution at 100° C. The mixture was reacted at 105° C. for 2 hours, giving an epoxy resin-amine adduct having an amine value of 120.

The reaction mixture was mixed with 100 parts of polyamide resin prepared by dimeric acid and ethylene diamine, having the amine value of 100 and the melting point of about 50° C. Then 150 parts of partially blocked polyisocyanate (prepared by reacting one mole of "Desumodur L" with 2 moles of phenol) was added and the mixture was reacted at 60° C. for 2 hours.

To 120 parts of the adduct are added 4.0 parts of acetic acid, 223 parts of deionized water, 5.0 parts of triol-type polyether (trade mark: "GP-3000," product of Sanyo Chemical Industry Co. Ltd.) having a molecular weight of 3,000 and prepared by adducting propylene oxide with glycerin, whereby a composition of this invention is obtained which contains 40% of solids.

COMPARISON EXAMPLES 1 to 7

Similar compositions are prepared in the same manner as in Examples 1 to 7 respectively, except that polyether polyol is not used.

An electrophoretic bath (13% solids) is prepared from each of the cationic aqueous compositions of Examples 1 to 7 and Comparison Examples 1 to 7 by adding thereto 18 parts of red iron oxide, 9 parts of clay and 3 parts of lead silicate per 100 parts of the composition, kneading the mixture in a ball mill for 20 hours, and diluting the mixture with water. Steel panels treated with iron phosphate are subjected to electrophoretic coating operation in the bath at varying voltages for 3 minutes, then rinsed with water and thereafter baked at 180° for 30 minutes. The stability of the composition is determined by allowing the composition to stand in the atmosphere at 30° for one month with stirring and thereafter used for electrophoretic coating operation in the same manner as above, with the evaporation loss compensated for with deionized water.

The results are given in the Tables 1 and 2 below.

Table 1

|  | Ex. 1 | Comp. Ex. 1 | Ex. 2 | Comp. Ex. 2 | Ex. 3 | Comp. Ex. 3 | Ex. 4 | Comp. Ex. 4 |
|---|---|---|---|---|---|---|---|---|
| Properties of bath (30° C.) pH | 5.3 | 5.3 | 6.5 | 6.45 | 6.1 | 6.0 | 7.1 | 7.05 |
| Specific conductivity ($\mu v$/cm) | 2000 | 2150 | 1200 | 1320 | 2380 | 2500 | 1550 | 1600 |
| Electrophoretic characteristics Voltage giving 25$\mu$ film thickness | 150 | 200 | 250 | 300 | 150 | 200 | 300 | 350 |
| Surface smoothness (*1) | A | C | B | D | A | C | A | B |
| Properties of film Resistance to salt spray (hr.) (2*) | 360 | 300 | 500 | 400 | 240 | 240 | 900 | 720 |
| Resistance to water (40° C. 40 days) | No change | No change | No change | No change | No change | No change | No change | No change |
| Stability Voltage giving 25$\mu$ film thickness | 100 | None | 300 | None | 220 | 300 | 320 | None |
| Surface smoothness | B | — | B | — | B | D | A | — |

Table 2

|  | Ex. 5 | Comp. Ex. 5 | Ex. 6 | Comp. Ex. 6 | Ex. 7 | Comp. Ex. 7 |
|---|---|---|---|---|---|---|
| Properties of bath (30° C.) pH | 5.9 | 5.8 | 6.8 | 6.7 | 6.6 | 6.6 |
| Specific conductivity ($\mu v$/cm) | 2380 | 2440 | 1300 | 1500 | 3100 | 3250 |
| Electrophoretic characteristics Voltage giving 25$\mu$ film thickness | 145 | 160 | 150 | 200 | 150 | 175 |

Table 2-continued

|  | Ex. 5 | Comp. Ex. 5 | Ex. 6 | Comp. Ex. 6 | Ex. 7 | Comp. Ex. 7 |
|---|---|---|---|---|---|---|
| Surface smoothness (*1) | A | A | B | A | A | A |
| Properties of film |  |  |  |  |  |  |
| Resistance to salt spray (hr.) (*2) | 720 | 600 | 500 | 400 | 720 | 600 |
| Resistance to water (40° C., 40 days) | No change | No change | No change | No change | No change | No change |
| Stability |  |  |  |  |  |  |
| Voltage giving 25μ film thickness | 190 | 250 | 200 | 350 | 200 | 250 |
| Surface smoothness | A | C | B | C | A | C |

Notes:
(*1) A: very good
B: good
C: slightly poor
D: orange peeling over the entire surface
(*2) The time taken for the film to peel off over a width of at least 3 mm (according to ASTM D 2803) or for the frequency of blisters to exceed Blistering Standard No. 8, Medium (according to ASTM D 714).

What we claim is:

1. A cationic electrophoretic coating composition comprising an aqueous medium and a resinous binder dispersed therein, said resinous binder comprises:
   (A) A water-soluble or water-dispersible resin prepared by contacting a reaction product with a partially blocked polyisocyanate having in the molecule not more than one free isocyanate group and at least one blocked isocyanate group on the average at a temperature of 40° to 130° C., and subsequently by neutralizing the resulting product with an acid, said reaction product being prepared by reacting a compound selected from the group consisting of fatty acid, polyamide or mixtures thereof with an adduct, said adduct being prepared by reacting an epoxy resin with a basic amino compound, the amount of said fatty acid and/or polyamide used being 1 to 100 parts by weight per 100 parts by weight epoxy resin and the basic amino compound being used in an amount not exceeding one mole per mole of epoxy group and
   (B) at least one polymer selected from the group consisting of an ethylene oxide addition polymer, a propylene oxide addition polymer and derivatives of the ethylene oxide addition polymer and/or propylene oxide addition polymer, said polymers and derivatives having a number average molecular weight of 500 to 10,000 and having a solubility of up to 60 parts by weight in 100 parts by weight of water at 25° C., the partially blocked polyisocyanate being used in an amount of 1 to 100 parts by weight per 100 parts by weight of the epoxy resin and the component (B) being used in an amount of 0.5 to 30% by weight based on the component (A) as solid.

2. The cationic electrophoretic coating composition as defined in claim 1 wherein the epoxy resin is a resin prepared from bisphenol A and epichlorohydrin.

3. The cationic electrophoretic coating composition as defined in claim 1 wherein the basic amino compound is a water-soluble aliphatic amino compound.

4. The cationic electrophoretic coating composition as defined in claim 1 wherein the reaction products are compounds prepared by reacting an epoxy resin, a basic amino compound and a fatty acid and/or polyamide, the fatty acid being selected from the group consisting of safflower oil fatty acid, linseed oil fatty acid, soybean oil fatty acid, tall oil fatty acid, cotton seed oil fatty acid, coconut oil fatty acid, tung oil fatty acid, oicitica oil fatty acid and dehydrated castor oil fatty acid.

5. The cationic electrophoretic coating composition as defined in claim 4 wherein the polyamide is a reaction product selected from the group consisting of phthalic acid, adipic acid and sebasic acid, and at least one of ethylenediamine, hexamethylenediamine, diethylenetriamine, triethylenetetramine, propylenediamine and butylenediamine.

6. The cationic electrophoretic coating composition as defined in claim 1 wherein the water-soluble or water dispersible resin is a reaction product of:
   (i) a compound prepared by reacting an epoxy resin, a basic amino compound and a fatty acid and/or polyamide, the fatty acid being selected from the group consisting of safflower oil fatty acid, linseed oil fatty acid, soybean oil fatty acid, tall oil fatty acid, cotton seed oil fatty acid, coconunt oil fatty acid, tung oil fatty acid, oicitica oil fatty acid and dehydrated castor oil fatty acid, and
   (ii) a partially blocked polyisocyanate compound having in the molecule not more than one free isocyanate group and at least one blocked isocyanate group on the average.

7. The cationic electrophoretic coating composition as defined in claim 1 wherein the polymer or the derivatives thereof have a number average molecular weight of 700 to 5,000.

8. The cationic electrophoretic coating composition as defined in claim 1 wherein the polymer or the derivatives thereof have a solubility of 20 to 60 parts by weight in 100 parts by weight of water at 25° C.

9. The cationic electrophoretic coating composition as defined in claim 1 wherein the derivative is a compound prepared by modifying the addition polymers with a monoalcohol, diol, alcohol having at least three hydroxyl groups in the molecule, alkylphenol with an alkyl having at least eight carbon atoms, isocyanate compound or carboxylic acid.

10. The cationic electrophoretic coating composition as defined in claim 1 which contains 0.5 to 30% by weight of the component (B) based on the component (A).

11. The cationic electrophoretic coating composition as defined in claim 1 further comprising a cationic or nonionic water-soluble or water-dispersible resin in an amount of up to 20% by weight calculated as solids and based on the overall resin solids.

* * * * *